(12) United States Patent
Giarrizzo, Jr. et al.

(10) Patent No.: US 12,094,006 B2
(45) Date of Patent: Sep. 17, 2024

(54) COMPUTER SOFTWARE, COMPUTER SYSTEM, COMPUTER-IMPLEMENTED METHOD FOR PREPARING INSURANCE CLAIMS PACKAGE AND INSURANCE CLAIMS PACKAGE PREPARED BY SAME

(71) Applicant: DCR IP Company, LLC, Mentor, OH (US)

(72) Inventors: Michael Giarrizzo, Jr., Chagrin Falls, OH (US); Harley Michael Wegman, Hickory, NC (US); Andrew Tweed Warren, Stony Point, NC (US)

(73) Assignee: DCR IP Company, LLC, Mentor, OH (US)

( * ) Notice: Subject to any disclaimer, the term of this patent is extended or adjusted under 35 U.S.C. 154(b) by 0 days.

(21) Appl. No.: 17/172,057

(22) Filed: Feb. 9, 2021

(65) Prior Publication Data
US 2022/0253940 A1    Aug. 11, 2022

(51) Int. Cl.
*G06Q 40/00*     (2023.01)
*G06F 3/04842*   (2022.01)
*G06F 16/958*    (2019.01)
*G06Q 40/08*     (2012.01)

(52) U.S. Cl.
CPC ......... *G06Q 40/08* (2013.01); *G06F 3/04842* (2013.01); *G06F 16/986* (2019.01)

(58) Field of Classification Search
CPC .... G06Q 40/08; G06F 16/986; G06F 3/04842
See application file for complete search history.

(56) References Cited

U.S. PATENT DOCUMENTS

| | | | |
|---|---|---|---|
| 2002/0035488 A1* | 3/2002 | Aquila | G06Q 40/02 705/4 |
| 2011/0218825 A1* | 9/2011 | Hertenstein | G06Q 40/08 715/849 |
| 2016/0352808 A1* | 12/2016 | Mafera | H04W 4/12 |
| 2017/0221151 A1 | 8/2017 | Forkuo | |
| 2018/0322472 A1 | 11/2018 | Russell | |
| 2021/0201274 A1 | 7/2021 | O'Brien et al. | |
| 2022/0358469 A1 | 11/2022 | Biggs | |

OTHER PUBLICATIONS

International Search Report for PCT/EP2023/030114 dated Dec. 14, 2023.
Written Opinion for PCT/EP2023/030114 dated Dec. 14, 2023.

* cited by examiner

*Primary Examiner* — Rajesh Khattar
(74) *Attorney, Agent, or Firm* — Curatolo Sidoti & Trillis Co., LPA; Salvatore A. Sidoti; Floyd Trillis, III

(57) ABSTRACT

Computer software and computer-implemented method for preparing an insurance claims package in connection with a damaged vehicle for submission to the vehicle owner's insurance company. A computer-readable medium for storing executable software for preparing an insurance claims package for a damaged vehicle, a computer system including the executable computer software stored in the computer-readable medium for preparing an insurance claims package for a damaged vehicle damage are also disclosed. An insurance claims package for vehicle damage repair is prepared by the computer-implemented method by executing the computer software stored in the computer-readable medium of a computer system.

21 Claims, 11 Drawing Sheets

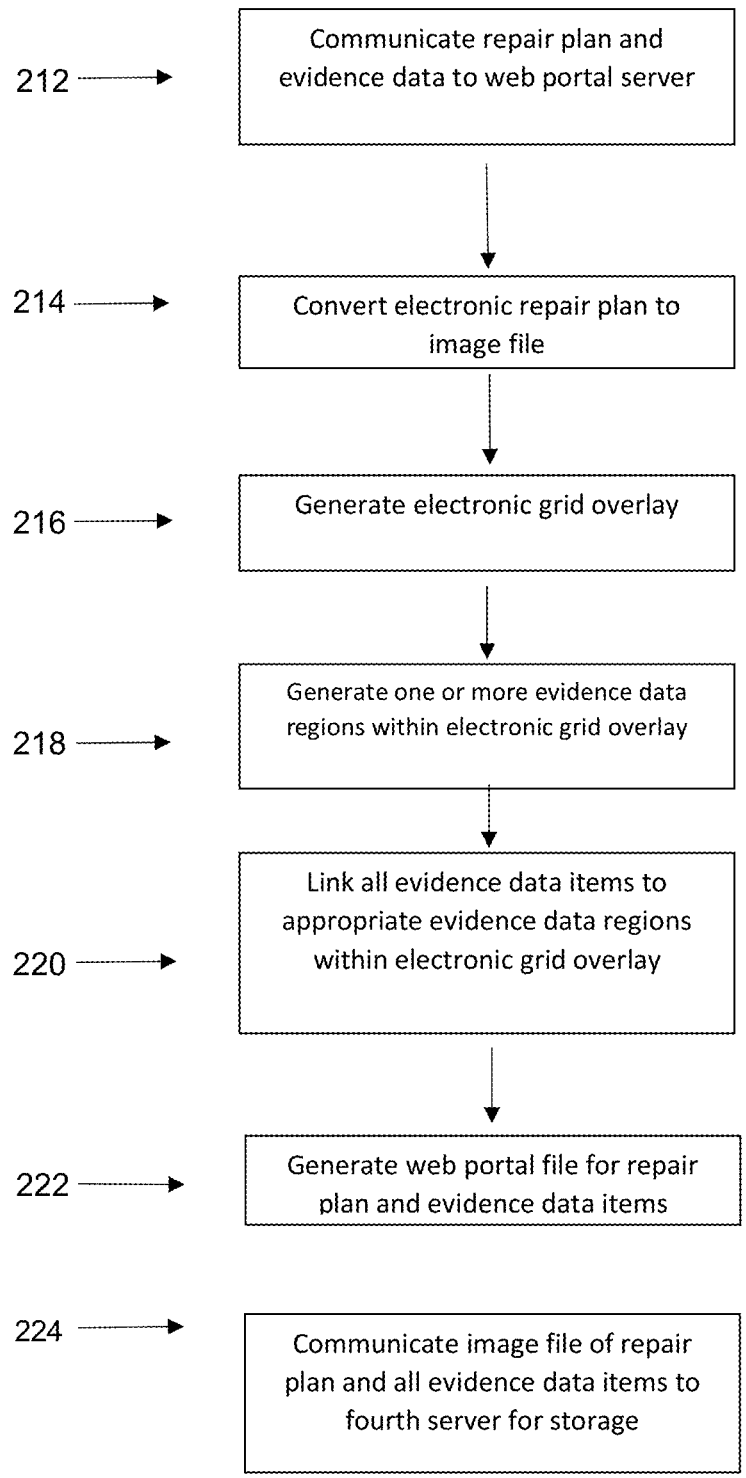
FIG. 2 (con't)

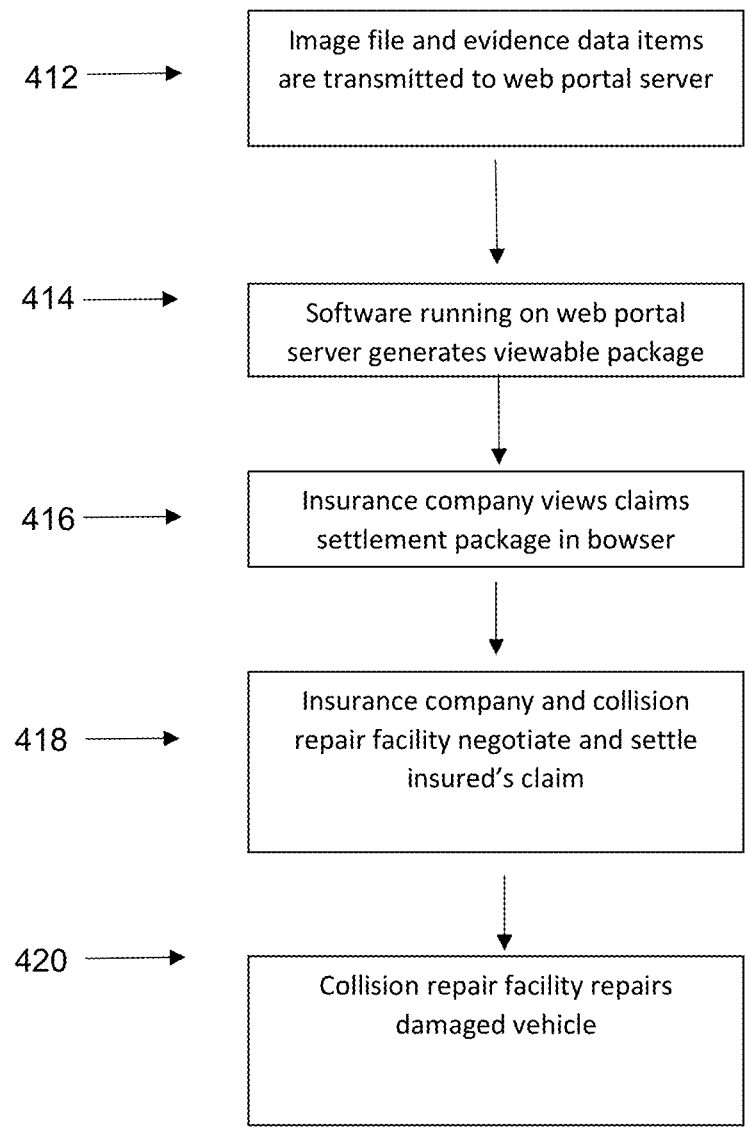
FIG. 4 (con't)

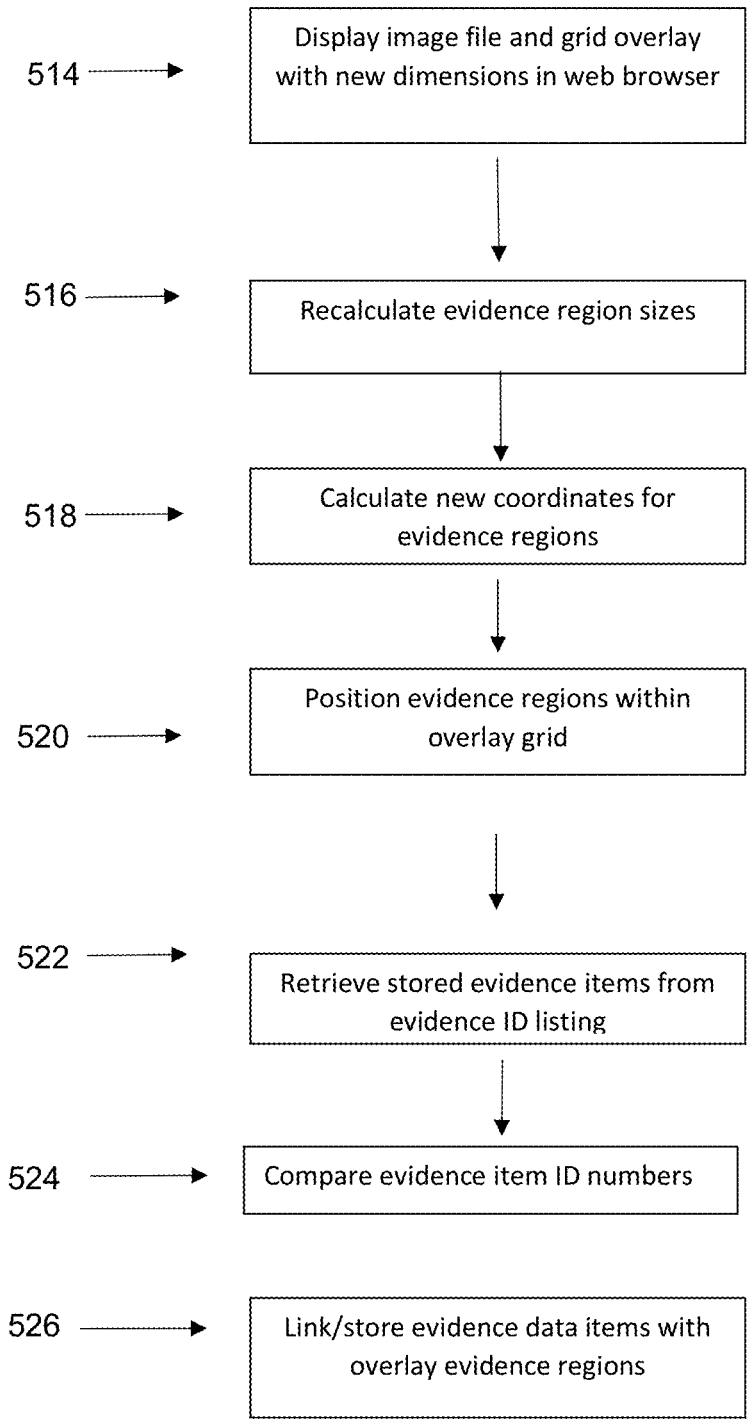
FIG. 5 (con't)

FIG. 8

COMPUTER SOFTWARE, COMPUTER SYSTEM, COMPUTER-IMPLEMENTED METHOD FOR PREPARING INSURANCE CLAIMS PACKAGE AND INSURANCE CLAIMS PACKAGE PREPARED BY SAME

TECHNICAL FIELD

Illustrative embodiments of the present disclosure relate to a computer-implemented method for preparing an insurance claims package for a damaged vehicle, a computer-readable medium for storing executable software for preparing an insurance claims package for a damaged vehicle, a computer system including computer software for preparing an insurance claims package for a damaged vehicle, an insurance claims package for a damaged vehicle prepared by the computer-implemented method and computer system, and a vehicle damage repair method.

BACKGROUND

The exterior body and mechanical systems of a vehicle may be damaged in a collision, by intentional vandalism, or by other causes. The owner of the vehicle usually takes the damaged vehicle to a vehicle collision repair facility to assess the damage and to obtain an estimate of the costs to repair the damage to the vehicle. In situations where the damage to the vehicle is severe, rendering it impossible for the owner to drive the vehicle, the owner will need to arrange for a service, such as a towing service, to pick up the car and transport it to the vehicle collision repair facility.

Once the damaged vehicle arrives at the vehicle collision repair facility, trained personnel at the vehicle collision repair facility inspect the damaged vehicle, determine the replacement parts and labor time required to complete the repairs to the damage vehicle, and prepare a comprehensive repair plan or estimate to complete the repairs for the vehicle owner.

Owners of vehicles usually have insurance coverage to cover the cost of the repair of the damaged vehicle. Insurers typically do not accept the initial estimate provided by the vehicle collision repair facility. Moreover, the estimate prepared by the vehicle collision repair facility may differ, perhaps widely, from an insurer's assessment of the cost of repair. Both the insurer and the collision repair facility may have different assessments of labor time, prevailing labor rates, and/or cost of replacement parts. There may also be different perspectives between the insurer and the vehicle collision repair facility as to which parts are required to be replaced as part of the overall repair process. Insurers are also concerned about the possibility of fraud in the preparation of the repair plan and estimate.

The insurer will assess the initial repair plan and cost estimate prepared by the vehicle collision repair facility and submitted to the insurance company on behalf of the insured (ie, owner of the damaged vehicle). The insurer generally assigns an insurance adjuster to evaluate the insured's claim, and the proposed repair plan and cost estimate. This process typically involves the insurance adjuster inspecting the insured's damaged vehicle that is located at the vehicle collision repair facility, and interviewing the insured about the event that resulted in the damage to the vehicle. The insurance adjuster then prepares a report which that is used to generate the insurer's independent assessment, including a cost estimate for the repairs to the damaged vehicle.

The insurer provides its independent cost estimate to the vehicle collision repair facility. If the collision repair facility disagrees with the insurer's independent cost estimate, the repair facility and the insurer will then negotiate in to attempt to reach agreement on the repair plan and overall cost for the repair. Once an agreement is reached between the insurer and the collision repair facility, then the facility will begin to repair the damaged vehicle in accordance with the repair plan and within the agreed upon cost estimate.

Claims settlement continues to be a problem across the vehicle collision repair industry. The collision repair facilities have attempted to solve these problems by entering into Direct Repair Program relationships with insurers. This essentially transferred the techniques and actions for repairing a damaged vehicle into the hands of the insurer. In order to get claims settled and to commence repair of the damage vehicle, collision repair facilities that do not have Direct Repair Program relationships with insurers are left to present information to insurers regarding the claim in some manner. This is usually accomplished by sending the insurer information in the form of separate files which leads to the insurer not receiving enough information or the correct information.

In view of the above shortcomings in connection with insurance claims and settlement of those claims in the vehicle collision repair industry, what is needed are improved systems and methods to prepare a vehicle collision repair plan, cost estimate and overall claims settlement package that includes all of the necessary evidence and information that can be easily transmitted to the insurance company in enable efficient review and prompt settlement of the insured's claim.

SUMMARY

According to certain illustrative embodiments, disclosed is a computer-implemented method for preparing an insurance claims settlement package for submission to an insurance company, the method being executed by one or more processors, and comprising positioning an electronic grid overlay over an image file of a vehicle collision damage repair plan for a damaged vehicle, wherein the image of the vehicle collision damage repair plan displays at least one work operation for repairing the damaged vehicle; positioning at least one electronic evidence region within the electronic grid overlay over a selected work operation displayed by the image of the vehicle collision damage repair plan; selecting at least one evidence item stored in a computer storage medium relating a particular work operation for repairing the damaged vehicle; and electronically linking the selected at least one evidence item to the evidence region overlaying the particular work operation displayed on the image of the vehicle collision damage repair plan.

According to other illustrative embodiments, a non-transitory computer-readable storage media coupled to one or more processors and having instructions stored thereon which, when executed by the one or more processors, cause the one or more processors to perform operations for preparing an insurance claims package for submission to an insurance company, the operations comprises positioning an electronic grid overlay over an image file of a vehicle collision damage repair plan for a damaged vehicle, wherein the image of the vehicle collision damage repair plan displays at least one work operation for repairing the damaged vehicle; positioning at least one electronic evidence region within the electronic grid overlay over a selected work operation displayed by the image of the vehicle collision damage repair plan; selecting at least one evidence item stored in a computer storage medium relating a particular work operation for repairing the damaged vehicle;

and electronically linking the selected at least one evidence item to the evidence region overlaying the particular work operation displayed on the image of the vehicle collision damage repair plan.

According to further illustrative embodiments, a computer system comprises one or more processors; and a computer-readable storage medium coupled to the one or more processors and having instructions stored thereon which, when executed by the one or more processors, cause the one or more processors to perform operations for preparing an insurance claims package for submission to an insurance company, the operations comprising: positioning an electronic grid overlay over an image file of a vehicle collision damage repair plan for a damaged vehicle, wherein the image of the vehicle collision damage repair plan displays at least one work operation for repairing the damaged vehicle; positioning at least one electronic evidence region within the electronic grid overlay over a selected work operation displayed by the image of the vehicle collision damage repair plan; selecting at least one evidence item stored in a computer storage medium relating a particular work operation for repairing the damaged vehicle; an electronically linking the selected at least one evidence item to the evidence region overlaying the particular work operation displayed on the image of the vehicle collision damage repair plan.

According to further illustrative embodiments, an electronic insurance claims settlement package for a damaged vehicle comprises an electronic image file composed of data relating to a damaged vehicle and including at least one damage repair operation displayed by said electronic image; an electronic overlay grid overlaying at least a portion of said electronic image file; at least one evidence region positioned within said overlay grid; and at least one evidence item electronically linked to said at least one evidence region.

According to further illustrative embodiments, a method of repairing vehicle collision damage comprises receiving a vehicle having collision damage; inspecting the vehicle to determine said collision damage; collecting evidence items relating to the collision damage to the vehicle and to the repair of the damaged vehicle; preparing an electronic insurance claims settlement package, said package comprising an electronic image file composed of data relating to a damaged vehicle and including at least one damage repair operation displayed by said electronic image, an electronic overlay grid overlaying at least a portion of said electronic image file, at least one evidence region positioned within said overlay grid and at least one evidence item electronically linked to said at least one evidence region; submitting the electronic insurance claims settlement package to an insurance company for settlement of an insurance claim relating to the damaged vehicle; and repairing the damaged vehicle in accordance a settled insurance claim.

BRIEF DESCRIPTION OF DRAWINGS

FIG. 8 is a schematic representation of a portion of an illustrative electronic repair plan.

DETAILED DESCRIPTION

Figure 1:
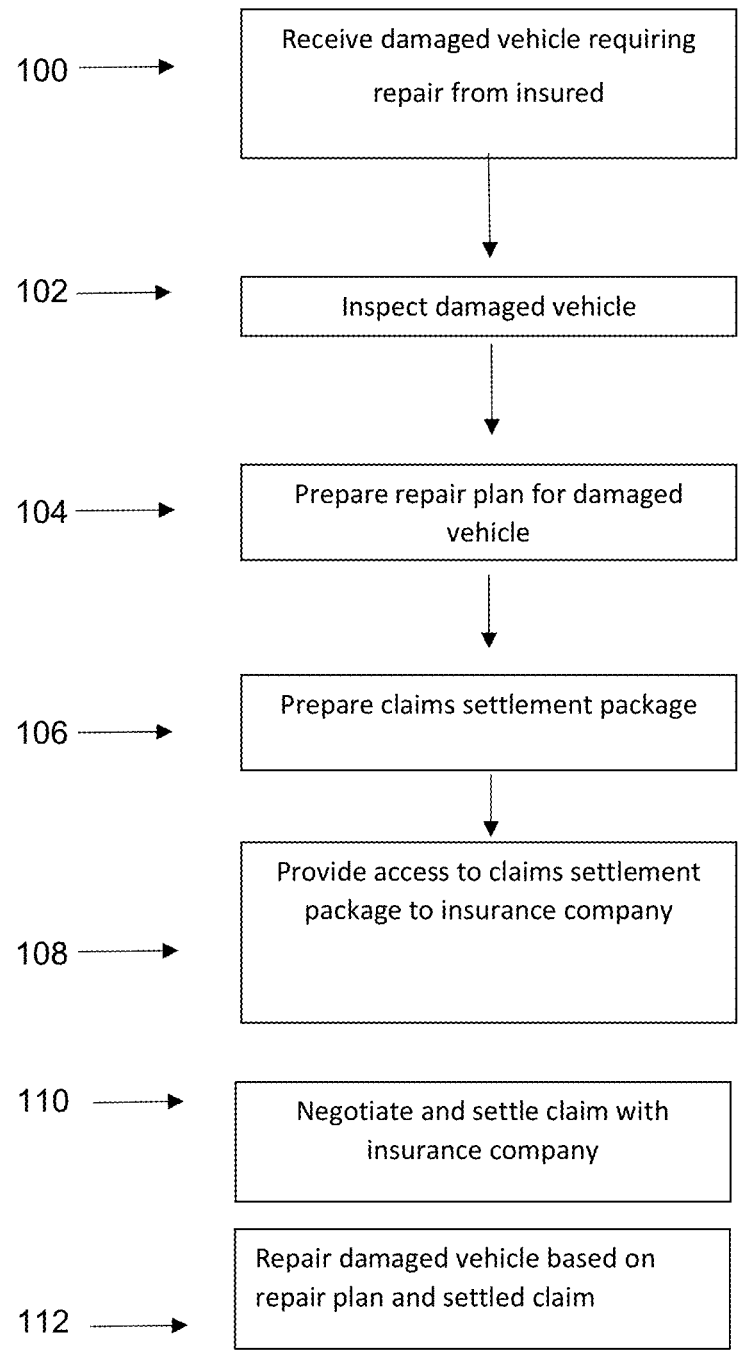
FIG. 1 is a flow chart for an illustrative embodiment of the computer-implemented method for settling an insurance claim and repairing a damaged vehicle.

Illustrative embodiments of the present disclosure comprise executable computer software and a computer-implemented method for preparing an insurance claims package for claims settlement in connection with a damaged vehicle.

Additional illustrative embodiments comprise a computer-readable medium for storing executable software for preparing an insurance claims package for claims settlement in connection with a damaged vehicle.

Further illustrative embodiments comprise a computer system comprising at least one computer processor and at least one computer readable medium for storing executable software for preparing an insurance claims package for claims settlement in connection with a damaged vehicle.

Further illustrative embodiments comprise an insurance claims package for claims settlement of an insurance claim in connection with a damaged vehicle prepared by the computer-implemented method, executable computer software and computer system. The electronic insurance claims settlement package includes all of the information needed by an insurance company to enable the insurance company to settle an insurance claim for vehicle damage with its insured, and to enable the vehicle collision repair facility to commence the vehicle collision damage repair process for the insured.

The insurance claims settlement package includes an electronic package comprised of an electronic image displaying data relating to the overall vehicle repair plan that displays one or more work operations or work steps of the repair plan in different regions of the image of the repair plan. An electronic grid overlay is electronically created or generated by the execution of computer software, and the electronic grid is positioned over the electronic image of the repair plan. According to certain embodiments, the outer perimeter dimensions of the electronic overlay grid is electronically configured and set to be substantially coextensive with the outer perimeter dimension of the underlying image of the repair plan. The electronic overlay grid is electronically configured to accommodate the positioning of one or more overlay data content regions, such as evidence item regions, over the electronic overlay grid, and the layout of the one or more overlay data content regions within the outer perimeter of the overlay grid. One or more data content overlay regions having independent dimensions are positioned within the overlay grid positions overlaying a particular or specific work operation or work step displayed on the underlying electronic image of the vehicle collision repair plan. Electronically stored evidence data items corresponding to a specific work operation, step, or task are electronically linked to the specific overlay evidence region positioned within the electronic overlay grid over the displayed work operation, step or task to which the evidence data items relate.

Further illustrative embodiments comprise a vehicle damage repair method comprising a step including preparing an insurance claims package for claims settlement in connection with a damaged vehicle with the computer-implemented method, executable computer software and computer system, and repairing the damaged vehicle following settlement of the insured insurance claim(s) with the insured's insurance company.

The method of preparing the insurance claims package comprises receiving a vehicle having collision damage by a vehicle collision repair facility. Depending on the extent and nature of collision damage to the vehicle, the vehicle owner may be able to drive the damaged vehicle to the collision repair facility. Alternatively, if the extent and/or nature of the collision damage disables the vehicle or otherwise precludes normal road operation of the vehicle, then the damaged vehicle may be delivered to the vehicle collision repair facility by a suitable vehicle delivery means. For example, and without limitation, suitable vehicle delivery means include wheel-lift tow trucks and flat-bed recovery vehicles.

After the damaged vehicle has been delivered to the vehicle collision repair facility, trained collision repair facility personnel inspect the extent of damage to the vehicle and prepare a repair plan to repair the damaged vehicle. Each repair plan is specifically tailored to the particular damaged vehicle. The repair plan typically includes (1) the inspection location, which generally is the vehicle collision repair facility where the vehicle is to be repaired, (2) the name, address and other contact information for the owner of the damaged vehicle (ie, insured), (3) the name, address and contact information for the insured insurance company, (4) the insured insurance policy number for the policy of insurance that covers the vehicle for collision damage, (5) the date of loss (ie, the date of the accident or collision which resulted in the damage to the vehicle, (6) a claim number for the damaged vehicle, (7) a description of the damaged vehicle, for example, the manufacturer of the damaged vehicle, the model of the damaged vehicle, VIN number for the damaged vehicle, state of licensure of the vehicle, license number of the vehicle, exterior color, interior color, production date, mileage in, mileage out, and general condition of vehicle, (8) vehicle systems and features, for example, without limitation, transmission type (eg, automatic, manual, overdrive, 4 wheel drive), power (eg, power steering, power brakes, power windows, power locks, power mirrors, power seats, power adjustable pedals), décor (eg, dual mirrors, privacy glass, console storage, overhead console, interior trim type), convenience features (eg, air conditioning, intermittent wipers, tilt steering wheel, cruise control, rear defogger, keyless entry, alarm system, message center, steering wheel touch controls, rear window wiper, climate control, dual air condition, remote starter), radio (eg, FM radio, AM radio, stereo premium radio, satellite radio, CD player, CD changer/stacker), safety features (eg, air bags, anti-lock braking system, 4 wheel disc braking system, traction control, stability control, location and type of seats (eg, bench seats, bucket seats, split seats, leather seats, fabric seats, heated seats, rear heated seats, 3rd row seats), wheel type (eg, aluminum alloy wheels), and paint type (eg, clear coat paint), (9) the point of impact on the vehicle that caused the collision damage, and (10) description of the damage to the vehicle.

The exterior body and mechanical system of the vehicle is inspected to determine the extent of the collision damage and to develop a repair plan for the vehicle. During the inspection process, the inspection personnel at the vehicle collision repair facility capture digital photographs and videos of at least those portions of the vehicle that have sustained collision damage that must be repaired.

After the inspection process has been completed, the vehicle collision repair facility prepares the repair plan and a preliminary cost estimate for completing the repair plan. The preliminary cost estimate includes a listing of all parts that must be replaced on the damaged vehicle, which includes a brief description and part number for each part to be replaced. The preliminary repair cost estimate also includes an itemized listing of the labor time required to replace each part on the damaged vehicle. For parts that require painting, the preliminary cost estimate also includes the labor time associated with painting each specific part before it is installed on the vehicle be repaired. The preliminary cost estimate typically concludes with a total estimated cost for the replacement parts, the total estimated costs for exterior body labor, total estimated paint supply costs, total labor costs for painting, and the total overall cost for the entire repair.

According to certain illustrative embodiments, an electronic file comprising the initial repair plan and preliminary cost estimate is generated using any suitable industry standard software program for preparing cost estimates and repair plans in the vehicle collision repair industry. Without limitation, and only by way of illustration, the initial repair plan and cost estimate may be prepared using the CCC One software application. The CCC One software application may be stored on a storage medium of a host server of the vehicle collision repair facility and may be accessed by a user through one or more client computers in a host-client relationship. According certain embodiments, the initial repair plan and cost estimate may be prepared as a portable document format (ie, pdf) file.

A browser is a software application or program that runs on a client host and is used to request pages and other data from server hosts.

A client host is a computer that request pages and other data from server hosts via a browser software application. Pages and other data requested from server hosts may be displayed on a user interface, such as a display screen, on the client host, or may be downloaded to a storage medium of the client host.

A server host is a computer on the Internet that provides pages and other data via a Web server program.

According to the computer-implemented method, executable computer software when executed by one or more computer processors accesses the initial repair plan in its initially created format, such as a portable document format file, from a computer storage medium on a first server and transmits the initial repair plan file to a second server having a computer storage medium for storing data files containing the initial repair plan for a particular damaged vehicle and evidence data files relating to the initial repair plan. The initial repair plan may be accessed from the first server storage via machine-to-machine communication by one or more APIs established between the first and second servers.

In addition to the initial repair plan, all evidence data files needed to prepare the claims settlement package and to ultimately repair the damaged vehicle are gathered and communicated to the second server. The evidence data files may include, without limitation, digital photographs of regions of damage on the vehicle that is the subject of the repair plan, videos of the damaged vehicle, photographs or drawings of replacement parts and hardware, and/or electronic documents containing repair directions, guidance and instructions for carrying out a work operation, step or task in the overall vehicle repair plan. The evidence data files are accessed from the first server and transmitted to the second server via machine to machine communication through an API established between the first and second servers.

According to the computer-implemented method, executable computer software when executed by one or more computer processors accesses the initial repair plan in its initially created format, such as a portable document format file, and one or more evidence files relating to the repair plan, from a computer storage medium on the first server and transmits the initial repair plan file and evidence files to a second server, which may be a Web portal server, having a computer storage medium for manipulating and storing data files containing the initial repair plan for a particular damaged vehicle and evidence data files relating to the initial repair plan. The initial repair plan and evidence files may be accessed from another server storage, and/or from third party data information repositories, and transmitted to the second server via machine-to-machine communication by one or more APIs established between the various servers. The API calls to the first server to retrieve the repair plan file and all evidence files relating to the repair plan. According to other embodiments, the computer system and computer-implemented method may include one or more additional computing devices established between the first and second servers for processing and/or storing data from the first server or third party data repositories.

The second server, which may be a Web portal server, has at least one computer processer capable of instructing a software operation or task and at least one computer storage medium for storing executable computer software for converting the electronic file (eg, the portable document format file) of the initial repair plan. The executable computer software stored on the Web portal server when executed by one or more computer processors converts the portable document format file into an image file format composed of digital data. The image file format may be a compressed format image file, an uncompressed format image file, or a vector format image file. Without limitation, suitable image file formats include JPEG (Joint Photographic Experts Group), JFIF (JPEG File Interchange Format), EXIF (Exchangeable Image File Format), TIFF (Tagged Image File Format), GIF (Graphics Interchange Format), BMP (Bitmap), PNG (Portable Network Graphics), Portable PixMap format (PPM), Portable GrayMap format (PGM), Portable BitMap format (PBM) and the like. The image file of the initial repair plan may be stored in a computer storage medium such as a database server.

Computer software application stored in a computer storage medium on the second server (ie, the Web portal server) when executed creates a transparent two-dimensional grid that is superimposed or otherwise positioned to overlay the image file of the initial repair plan and cost estimate. According to certain embodiments, the outer perimeter of the two-dimensional overlay grid may be coextensive with the outer perimeter of the image file of the repair plan and cost estimate. The two-dimensional grid permits the layout of content within the grid in at least one of rows and columns.

Computer software application stored in a computer storage medium on the second server (ie, the Web portal server) when executed creates and positions one or more evidence regions within the perimeter of the grid overlay. The evidence regions are created with desired dimensions, for example, having a desired width and height, and are positioned within the grid superimposed over a desired area of the underlying image. The evidence regions are independently positioned within the grid over a particular work operation or step in the overall vehicle collision repair process for repairing the damaged vehicle.

Computer software application stored in a computer storage medium on the second server (ie, the Web portal server) when executed electronically retrieves one or more evidence data files associated with the repair plan and electronically links the one or more evidence data files with a particular evidence region within the grid overlay. After a particular evidence region is created and positioned within the grid to overlay a desired work operation or work step displayed on the underlying image file of the repair plan by the computer software the region is populated with one or more items of evidence relating to the relating to the particular work operation or step of the repair process. The computer software causes the computer to access one or more desired items of evidence stored in a computer storage medium. The computer software selects the desired evidence items from the computer storage medium and associates the selected evidence items with a particular evidence region within the grid that overlays the image of the repair plan.

The items of evidence may be any visually or audibly perceptible item of information. The items of evidence that may be selected from the database and populated into the evidence regions within the grid may include, by way of example, and without limitation, images of the damaged vehicle and replacements parts, and documents. For example, separate digital images (such as photographs) of damaged regions of the vehicle that is the subject of the repair plan, such as front bumper, hood, roof of passenger cabin, trunk, rear bumper, driver's side front side panel, driver's side front door, driver's side rear door, driver's side rear panel, passenger side front side panel, passenger side front door, passenger side rear door, and passenger side rear panel and rear bumper of the exterior body of the vehicle. The items of evidence also include video clips of one or more damaged regions of the vehicle. The items of evidence may also include documents showing replacement parts and hardware that are required to repair a damaged region of the vehicle. The evidence may also include documents relating to Original Equipment Manufacturer (OEM) repair information or instructions, or Non-Original Equipment Manufacturer (Non-OEM), ie, aftermarket, part or repair information or instructions. All of the evidence is uploaded to a computer storage medium of a computing device.

When a specific item of evidence is selected from the storage medium, the ID of the selected item of evidence is stored in a list of evidence items associated with a particular evidence region of the grid. The computer software when executed determines the dimensions of the transparent overlay grid that is positioned over the image of the repair plan, the dimensions of each evidence region positioned within the overlay grid, and the coordinates of each evidence region within the grid, and the list of evidence items that are associated with each evidence region. The computer software causes all of this information to be stored in a computer stored medium such as a database. These software operations result in the creation of a portal server file that is stored on the portal server (ie, the second server) that identifies the image file for a particular vehicle repair plan, the dimensions of the grid overlay for the image file, the number and dimensions of the evidence data regions of the grid overlay, and all of the ID numbers of the evidence data that are independently associated with each of the evidence data regions.

After the electronic repair plan file is converted to an image file format and the portal server file is created for the particular repair plan, the image file of the repair plan and all evidence data files retrieved by the web portal server (ie, the second server) are communicated to a third storage server, such as a cloud storage server via machine-to-machine communication through an API established between the web portal server that the third storage server. The image file of the repair plan and all associated evidence data files are stored in a storage medium on the fourth storage server.

Computer software running in a web browser application, when properly executed by one or more computer processors of a computer system, permits access to and enables the viewing of a prepared electronic insurance claims settlement package by a user. In order for a claims agent or representative at the insured's insurance company to view the prepare claims settlement package for a particular vehicle damage repair plan, the collision repair facility provides the claims agent with electronic access to the plan. The vehicle collision repair facility may provide the electronic access rights to a particular repair plan by a web chat interface between the repair facility and the insurance company, an electronic mail message sent by the repair facility to the insurance company, a text message sent by the repair facility to the insurance company, an instant message sent by the repair facility to the insurance company, or any suitable means of communication of the access rights to the insurance company for viewing the claims settlement package.

The electronic access rights provided to the insurance company by the repair facility may include a link to a web portal and an electronic key that is associated a web portal file for the particular vehicle repair plan for which access rights are granted. A user that has been provided the link and electronic key uses the link to launch a web browser. The web browser has browser software that calls to the portal server to access the portal file for the vehicle repair plan associated with the electronic key. Computer software running on the web portal server, or an API established between the web portal server and the third storage server, calls to the third storage server to retrieve the image file and associated evidence data files for the vehicle repair plan designated by the web portal file accessed by the user with the electronic key.

The computer-readable storage medium of the web portal server, which is coupled to the one or more processors and which has the computer software or instructions stored thereon, when executed by the one or more processors, causes the one or more processors to perform operations for viewing a prepared insurance claims package, the operations comprising
(a) causing the image file of the initially prepared repair plan and cost estimate, the overlay grid, the one or more overlay evidence regions, and all evidence data items associated with each overlay evidence region to be loaded into the browser,
(b) calculating the size of the browser,
(c) comparing the calculated size of the browser to the saved dimension of the overlay grid,
(d) calculating the difference between the size of the browser and the saved dimension of the overlay grid,
(e) recalculating the size of the grid,
(f) calculating the percentage between the original grid size and the recalculated grid size,
(g) saving the percentage difference between the original grid size and the recalculated grid size
(h) displaying the image file and the grid overlay with new dimensions positioned over the top of the image file in the browser,
(i) recalculating the dimensions of each evidence overlay region based on the percentage difference between the size of the original overlay grid dimension and the recalculated overlay grid dimension;
determining the new coordinates of each evidence overlay region for positioning each evidence overlay region within the overlay grid having the recalculated grid size;
(k) positioning each overlay evidence region within the overlay grid according to the determined new dimensions for the overlay grid and each of the overlay evidence regions, and the new coordinates for each overlay evidence region;
(l) positioning the overlay evidence region in a view region of a browser;
(m) retrieving a list of stored evidence items ID's relating to the repair plan for damage vehicle;
(n) comparing the list of retrieved evidence item ID's to the stored evidence items ID's associated with the overlay evidence region in the view region of the browser; and
(o) storing the retrieved evidence item ID's that match the evidence item ID's associated with the overlay evidence region in the view region of the browser in a computer storage medium as an evidence item ID listing associated with the overlay evidence region in the view region of the browser.

When a user views a prepared insurance claims settlement package prepared in accordance with the present disclosure, the one or more evidence overlay regions positioned within the electronic overlay grid according to the dimensions and coordinates that were calculated and set for each of the one or more evidence overlay regions are displayed on the display screen. When a user input causes the computer software execute an operation to causing a specific evidence overlay region to come into a specific view area, the evidence items associated with that particular evidence overlay region are displayed on the display screen for the user to view. When an evidence overlay region is located in a specific view area of the web browser the list of evidence item IDs is obtained from that evidence overlay region. The list of all evidence items IDs is then filtered through and the evidence with ID's that match the ID's from the list from the evidence overlay region are put into a list in a computer storage medium. The list of evidence item IDs is then iterated through and each item of evidence is loaded from the server and displayed in the web browser.

The computer software includes a number of computer software modules for carrying out the method of preparing the insurance claims settlement package and completing the vehicle collision repair method. According to certain illustrative embodiments, the computer software modules include an estimating computer software module for creating the initial repair plan and preliminary cost estimate, the claims settlement package computer software module, and a vehicle damage repair management software module.

The repair plan and preliminary cost estimate is provided to the vehicle owner's insurance company for review and settlement of the claim.

FIG. 1 is a flow chart of an illustrative embodiment of the computer-implemented claims settlement and vehicle repair method. At block 100, a vehicle collision repair facility receives from an insured vehicle owner or a third party service provider a vehicle having exterior body and/or mechanical damage. At block 102, the vehicle collision repair facility inspects or otherwise assesses the damage to the damaged vehicle in order to ascertain the extent of the damage and to enable the vehicle collision repair facility to prepare a comprehensive collision repair plan and cost estimate for the damaged vehicle. This step in the method includes collection of evidence relating to the damage to the vehicle, which includes, for example, photographs and videos of the vehicle to memorialize the damage. At block 104, the vehicle collision repair facility prepares the initial repair plan and cost estimate based on the inspection of the damaged vehicle and the evidence collected in method step represented block 102. Following the preparation of the initial repair plan at block 102, the vehicle collision repair facility creates the electronic claims settlement package to settle the insured's claim with the insurance company. At block 108, the vehicle collision repair facility provides a representative of the insurance company with electronic access to the electronic claims package for review and negotiation with the collision repair facility. At block 110, after the insurance company has accessed and reviewed the electronic claim package, the insurance company and vehicle collision repair facility negotiate and settle the insured's claim. At block 112, the vehicle collision repair facility repairs the damaged vehicle in accordance with the repair plan and the settled claim.

Figure 2:
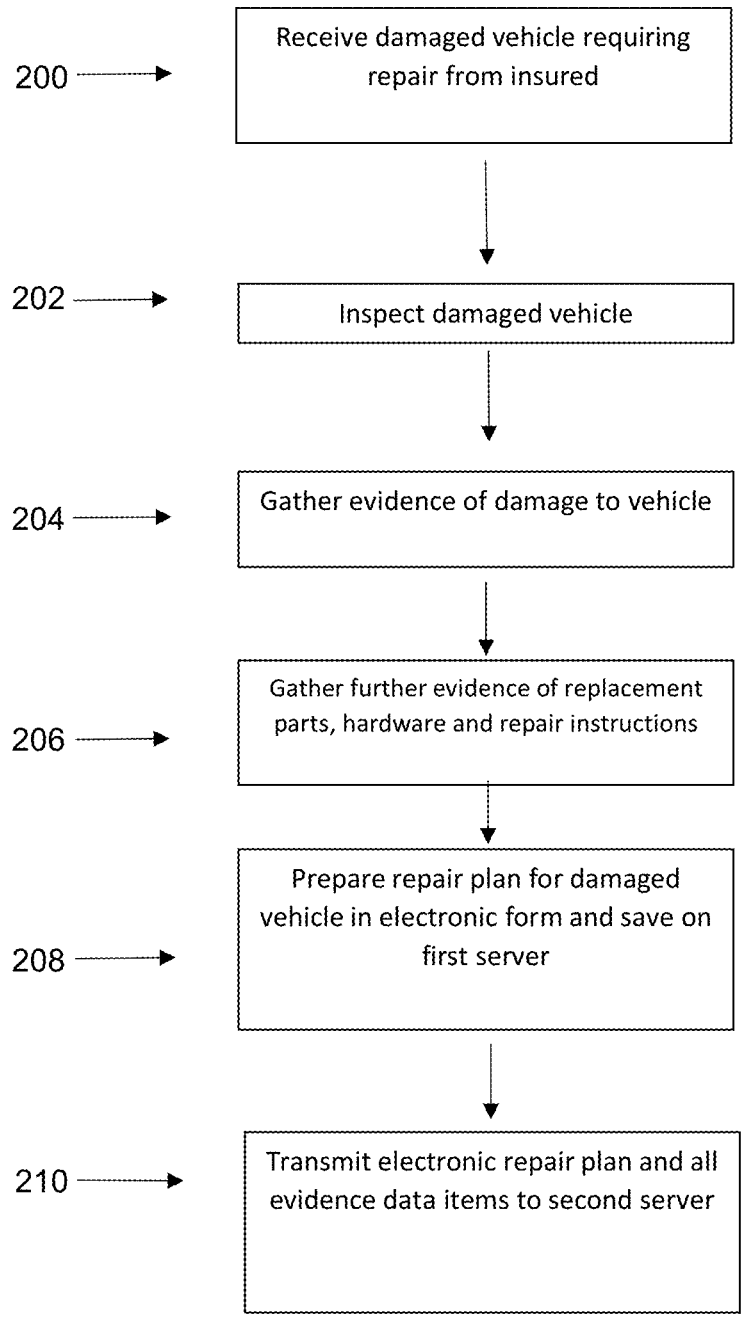
FIG. 2 is a flow chart for an illustrative embodiment of the computer-implemented method for preparing an electronic claims settlement package.

FIG. 2 is a flow chart of an illustrative embodiment of the computer-implemented for preparing an electronic claims package. At block 200, a vehicle collision repair facility receives from an insured vehicle owner or a third party service provider a vehicle having exterior body and/or mechanical damage. At block 202, the vehicle collision repair facility inspects or otherwise assesses the damage to the damaged vehicle in order to ascertain the extent of the damage and to enable the vehicle collision repair facility to prepare a comprehensive collision repair plan and cost estimate for the damaged vehicle. This step in the method includes collection of evidence relating to the damage to the vehicle, which includes, for example, photographs and videos of the vehicle to memorialize the damage. At block 204, based on the assessment of the damage to the vehicle, all evidence relating to replacement parts, hardware, primer and paint coatings, and documents providing repair directions/guidance/instructions are gathered for association with the particular repair plan. At block 208, the vehicle collision repair facility prepares the initial repair plan and cost estimate based on the inspection of the damaged vehicle and the evidence collected in method step represented blocks 202, 204. At block 208, the electronic repair plan is saved on a first server having computer storage medium, such as a database server. The first server may be located locally within a vehicle collision repair facility. At block 210, the electronic repair plan and gathered evidence items are optionally transmitted to an optional second server remote from the first server and stored in the computer storage medium within the second server. At block 212, the electronic repair plan is transmitted to a third server, which is a web portal server. Computer software stored and running in the web portal server converts the electronic repair plan to an image file at block 214. Computer software stored and running in the web portal server generates the electronic grid overlay and superimposes the overlay over the image of the repair plan at block 216. Computer software stored and running in the web portal server generates one or more evidence data regions and positions the one or more evidence regions within the electronic grid overlay over designated regions of the image of the repair plan at block 218. At block 220, all evidence data items are electronically linked to an appropriate evidence data region of the electronic grid overlay. A web portal file for the repair plan is created at block 222 and is stored in the storage medium of the web portal server. The web portal file identifies the image of the repair plan, the dimensions of the electronic grid, the dimensions and position of the evidence data regions and the evidence data items associated with each data evidence region for a particular repair plan for a particular damaged vehicle. At block 224, the image file of the repair plan and all associated data evidence items are transmitted to a fourth server and stored within a database on the fourth server. According to other embodiments, the computer-implemented method step represented block 210 does not occur, and the electronic repair plan and gathered evidence items are transmitted to a web portal server (ie, a second server) remote from the first server.

Figure 3:
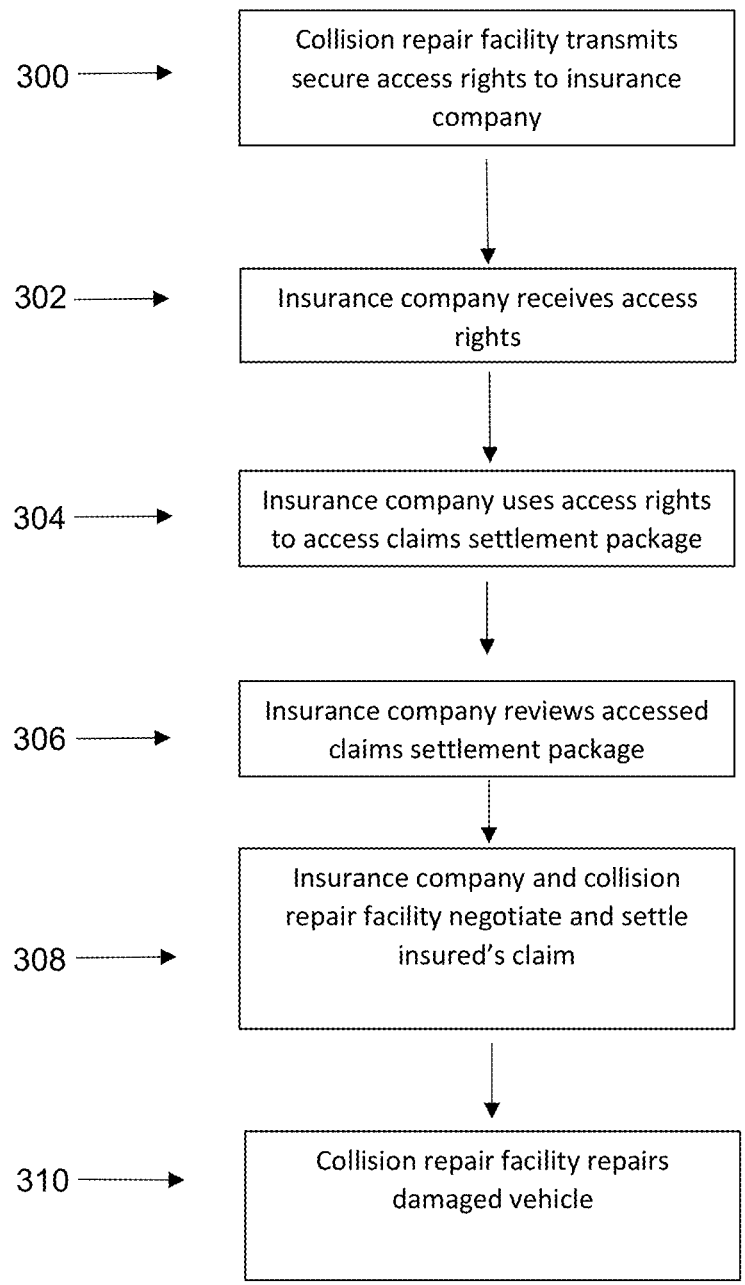
FIG. 3 is a flow chart for an illustrative embodiment for accessing and viewing the claims settlement package.

FIG. 3 is a flow chart of an illustrative embodiment of the computer-implemented for viewing an electronic claims package. In order for an insurance company to review and negotiate a claim with a vehicle collision repair facility, the insurance company must first have access to the claims settlement package. After the claims settlement package has been prepared by the vehicle collision repair facility, the facility transmits secure access rights to the electronic package to the insurance company as shown at block 300 and which is received by the insurance company at block 302. The insurance company uses the access rights, generally in the form of a link to launch a web browser program to call to a web portal, and an electronic key associated with the specific repair plan file stored on the web portal server, as shown at block 304. The key identifies the specific repair plan file and permits the issuance company representative to access and view the claims settlement package via the web browser as shown at block 306. Access to the electronic claims package enables the insurance company to review the package and to negotiate and settle the insured's claim at block 308. The damaged vehicle is repaired by the vehicle collision repair facility based on the settle claim at block 310.

Figure 4:
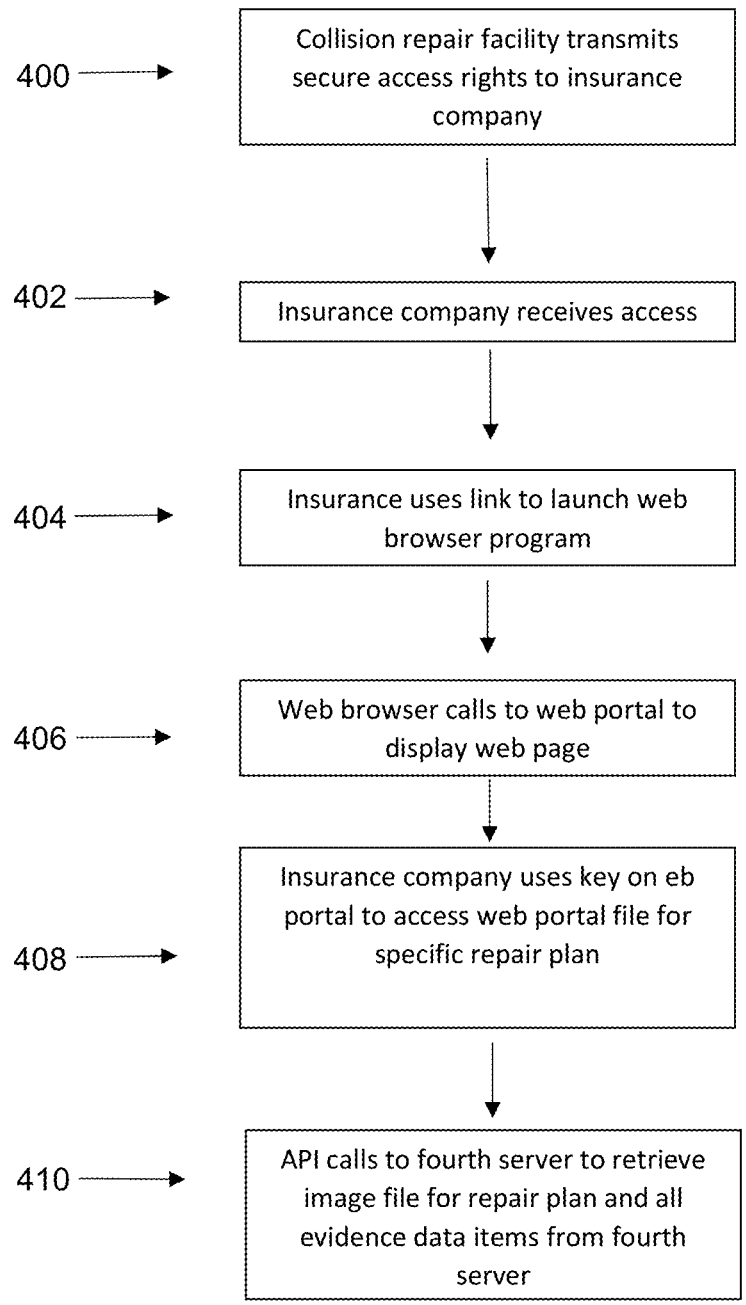
FIG. 4 is a flow chart for another illustrative embodiment of the computer-implemented method.

FIG. 4 is a flow chart of an illustrative embodiment of the computer-implemented for viewing an electronic claims package. After the claims settlement package has been prepared by the vehicle collision repair facility, the facility transmits secure access rights to the electronic package to the insurance company as shown at block 400 and which is received by the insurance company at block 402. The insurance company uses the access rights, generally in the form of a link to launch a web browser program to call to a web portal, and an electronic key associated with the specific repair plan file stored on the web portal server, as shown at block 404. The computer software running in the web browser calls to the web portal to display pages of the web portal at block 406. The key identifies the specific repair plan file and permits the issuance company representative to access and view the claims settlement package via the web browser as shown at block 408. An API established between the web portal server and the third server (or fourth server, depending on the particular embodiment) calls to the third server (or fourth server, depending on the particular embodiment) to retrieve the image file of the repair plan and the list of all evidence items associated with the specific repair plan at block 410. The image file and evidence data items are transmitted to the web portal server via the API established between the two servers at block 412. Computer software running on the web portal server receives the image file and evidence data items from the third server (or the fourth server, depending on the embodiment), and upon being executed, generates the electronic claims package viewable to the insurance company user at block 414. Access to the electronic claims package enables the insurance company to view the package at block 416 and to negotiate and settle the insured's claim at block 418. The damaged vehicle is repaired by the vehicle collision repair facility based on the settle claim at block 420.

Figure 5:
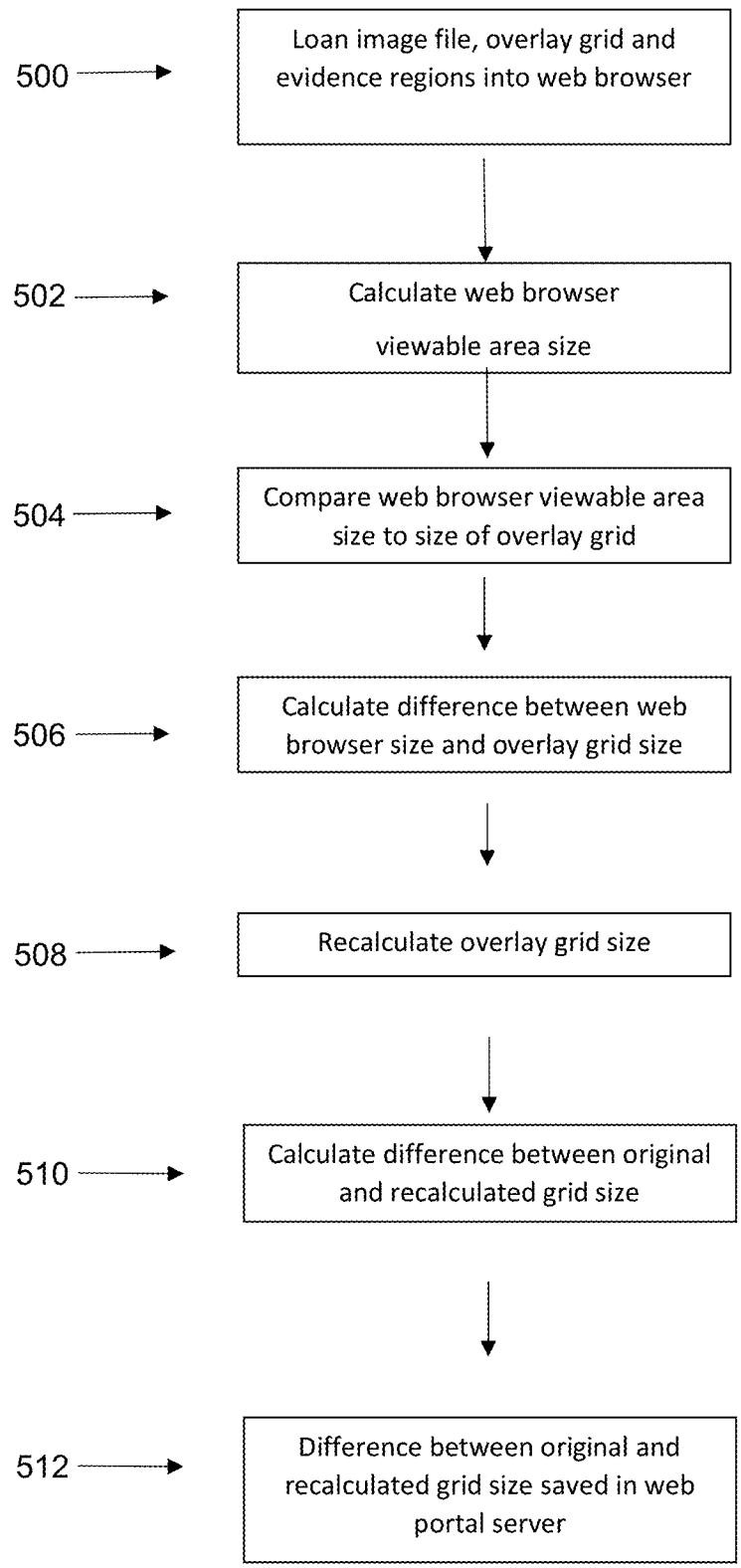
FIG. 5 is a flow chart of an illustrative embodiment of the disclosed computer-implemented method for viewing an electronic claims package via a web browser application.

FIG. 5 is a flow chart of an illustrative embodiment of the disclosed computer-implemented method for viewing an electronic claims package via a web browser application. FIG. 5 shows the sub-operations or sub-tasks of block 414 of FIG. 4 that are carried out by the computer software running on the web portal server to generate an electronic claims settlement package that is viewable in a web browser application by a user. At block 500, computer software running in the web portal server causes the image file of the initially prepared repair plan and cost estimate, the overlay grid, the one or more overlay evidence regions, and all evidence data items associated with each overlay evidence region to be loaded into the browser. At block 502, the software calculates the size of the web browser viewable area, and compares the calculated size of the browser to the saved dimensions of the overlay grid at block 504. At block 506, the computer software calculates the difference between the size of the browser and the saved dimension of the overlay grid. The computer software recalculates the size of the overlay grid at block 508, and then calculates the percentage difference between the original grid size and the recalculated grid size at block 510. The percentage difference between the original grid size and the recalculated grid size is save in the web portal server at block 512. The computer software displays the image file of the repair plan and the grid overlay with new dimensions positioned over the top of the image file in the web browser at block 514. The software recalculates the dimensions of each evidence overlay region based on the percentage difference between the size of the original overlay grid dimension and the recalculated overlay grid dimension at block 516. The computer software then determines the new coordinates of each evidence overlay region for positioning each evidence overlay region within the overlay grid having the recalculated grid size at block 518. The computer software causes each overlay evidence region to be positioned within the overlay grid according to the determined new dimensions for the overlay grid and each of the overlay evidence regions, and the new coordinates for each overlay evidence region; at block 520. The computer software retrieves a list of stored evidence data items ID's relating to the repair plan for damage vehicle at block 522. The computer software compares the list of retrieved evidence data item ID's to the stored evidence items ID's associated with each overlay evidence region in the view region of the web browser at block 524. The software electronically links and stores the evidence item ID's that match the evidence item ID's associated with the overlay evidence region in the view region of the web browser in a computer storage medium as an evidence item ID listing associated with the specific overlay evidence region of the grid in the view region of the browser at block 526. He user is able to view the entire claims settlement package within the web browser. The user is able to highlight any step of the repair plan claims which will bring into view via the web browser any and all evidence items that are associated with the highlighted step of the repair plan. This enables the insurance company to view in real-time via the web browser each step of the overall repair plan for a damaged vehicle, the basis for requiring each repair step (eg, digital photographs and videos of the damaged vehicle) and all documents relating to replacement parts, hardware, coatings, paints and repair instruction documents. The insurance company will therefore not be required to consult with outside sources of information in order to understand the insured's claim and to settle the claim.

Figure 6:
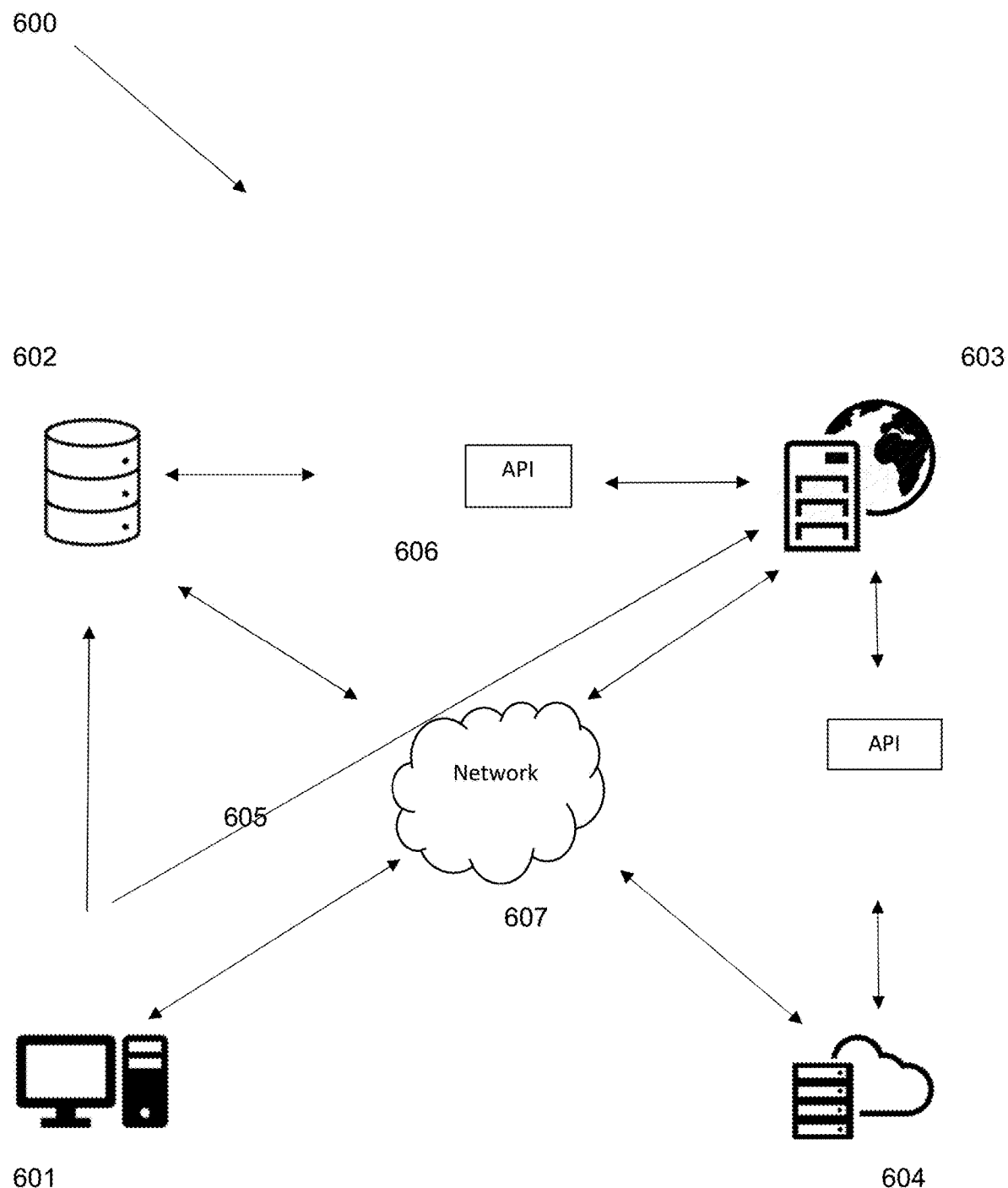
FIG. 6 is a schematic representation of an illustrative compute system suitable for use with the present methods.

FIG. 6 illustrative an exemplary computer system 600 for use in to present methods. Computer system 600 includes computer 601 for the purpose of preparing and storing the initial repair plan on a computer storage medium on a first database server for a particular damaged vehicle. Computer system 600 includes remote database server 602 for accepting in the initial repair plan for a damaged vehicle prepared with computer 601. Computer system 600 further includes web portal server 603 and optionally a fourth cloud database a server 604. Data files may be transmitted between server 601 and web portal server 603 by machine to machine communication via an API established between servers 601, 603. Data files may be transmitted between server 602 and web portal server 603 by machine to machine communication via an API 606 established between servers 602, 603. Data files may be transmitted between web portal server 603 and cloud storage server 604 by machine to machine communication via an API 607 established between servers 603, 604. All of the servers 601-604 of computer system 600 include data communication devices and data communication interfaces that permit the servers to communicate ad transmit data across a network 607.

Figure 7:
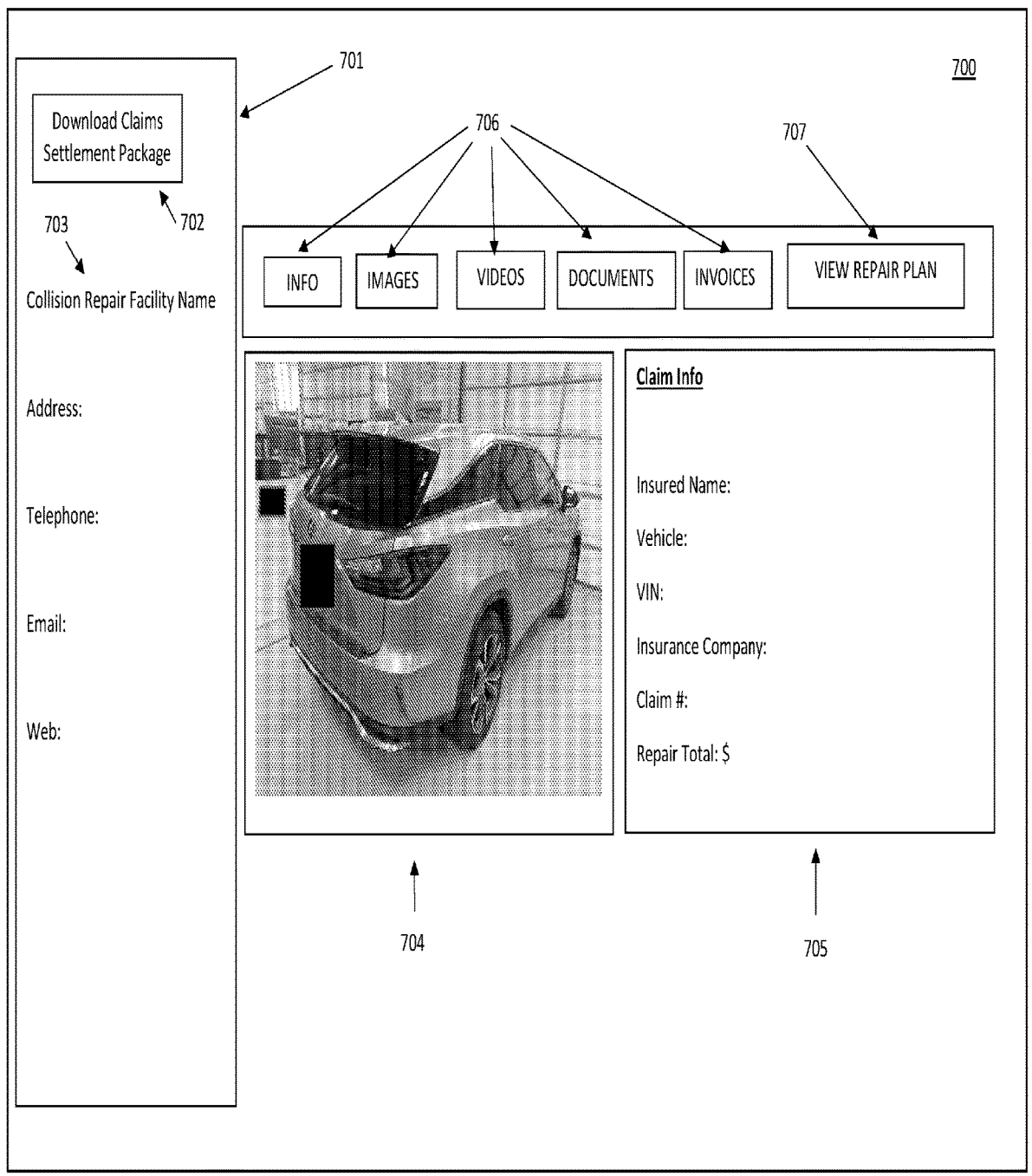
FIG. 7 is a schematic representation of an illustrative screen view of the web portal.

FIG. 7 shows an illustrative screen view of the web portal using a web browser application to access and retrieve the claims settlement package. Screen view 700 of the web portal includes a left panel 701 which includes information 703 about the vehicle collision repair facility, including, the name, address, telephone number, email address and web address. Panel 701 also includes button 702 to enable download of the complete electronic claims settlement package. Screen view 700 also includes an image 704 of the vehicle being repaired and information 705 about the claim (including, for example, insured name, vehicle type, VIN, insurance company information, claim number and running repair total). Positioned horizontally across the screen view 700 are a plurality of buttons 706 that enable the user to access and view images (photographs) and videos of the vehicle, documents, and invoices. Button 707 enables the user to access and view the entire repair plan for the vehicle.

Figure 8:
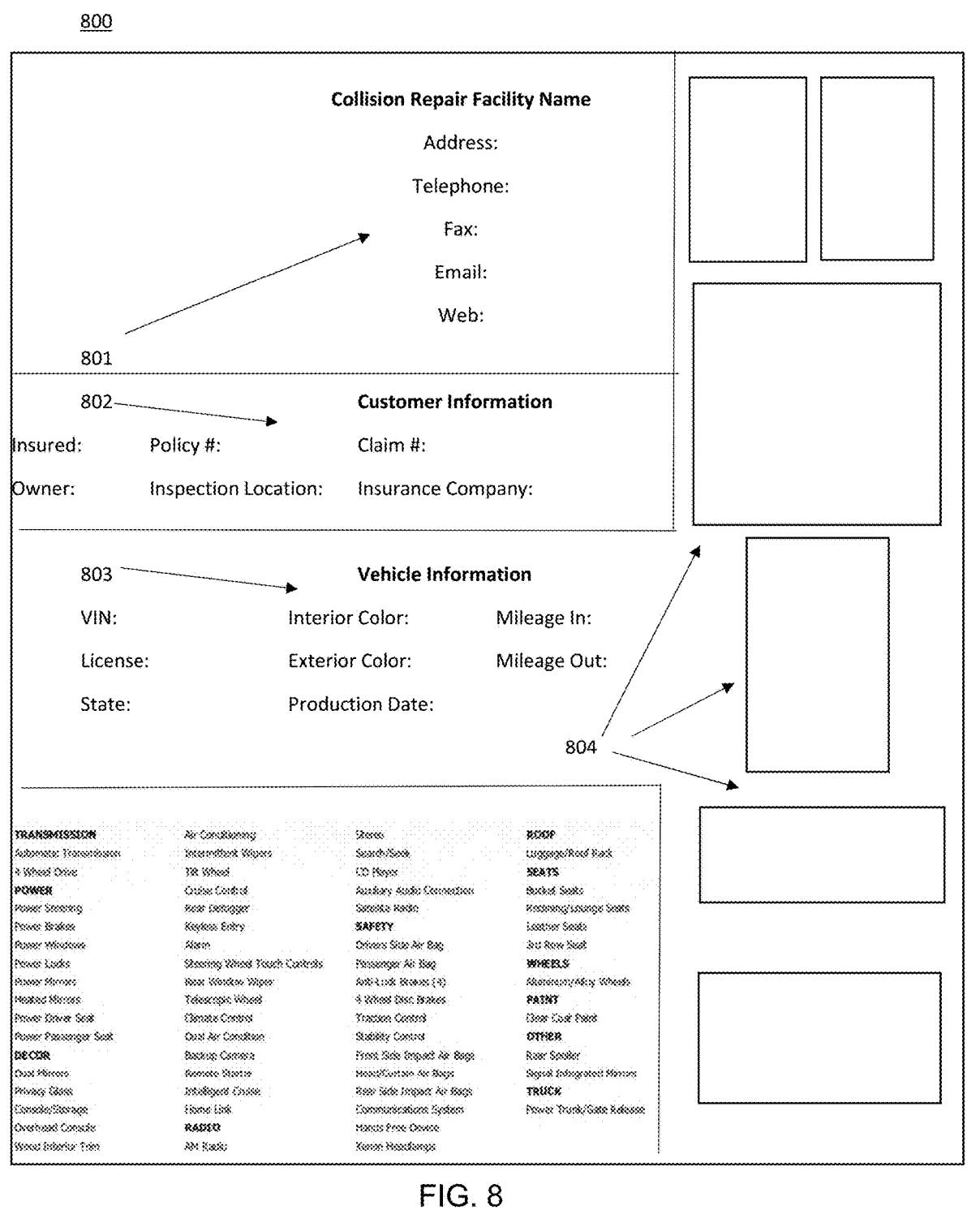

FIG. 8 is a schematic representation of a portion of an electronic repair plan 800. Repair plan 800 includes a section 801 providing information regarding the vehicle collision repair facility. Section 802 of the repair plan 800 includes information relating to the insured. Section 803 provides information about the damaged vehicle that is the subject of the repair plan. Positioned along the right side of the repair plan 800 is a region extending vertically from the top to the bottom of the repair plan 800 portion. This region displays a plurality of images 804 of the vehicle that is the subject of the repair plan. When a user highlights vehicle information portion 803 of the repair plan 800, the image region containing the images 804 of the vehicle is displayed to the viewer and is shown linked to the vehicle information section 803 of the repair plan 800. While this is only a portion or excerpt of an overall repair plan, different sections of the repair plan within the electronic grid overlay function in the same manner as vehicle information section 803. When the user hovers over a subsequent section in the repair plan 800 that has an evidence content region positioned over a work step of the repair plan, then the evidence data items associated with that particular evidence region will be displayed on the right column of the image of the repair plan and will be shown as linked to that section of the repair plan 800 that has been highlighted by the user.

The executable computer software for preparing and viewing the insurance claims package may be stored on one or more suitable computer readable media of any one or more of a wide variety of computing devices. By way of illustration, and not in limitation, suitable computing devices may be selected from a desktop computer, a laptop computer, a notebook computer, a tablet computer, a smartbook, a smart telephone, a Personal Digital Assistant (PDA), a handheld computer, a palmtop computer, a pocket computer, a file server, an embedded computer, a global positioning system (GPS) device, and an Internet-of-Things (IoT) capable device. An embedded computer refers to a computer that is incorporated within another device or machine.

According to illustrative embodiments, the computing device comprises at least a computer readable program memory (also referred to as computer storage medium), a computer processor in communication with the program memory, a user interface, and a display. The computer readable program memory generally comprises one or more fixed computer readable storage devices and one or more computer readable volatile storage devices. The computer readable program medium may comprise an electronic, magnetic, optical, electromagnetic, or semiconductor system. Without limitation, suitable examples of the computer readable program medium may include a semiconductor or solid state memory, a magnetic tape, a removable computer diskette, a random access memory (RAM), a read-only medium (ROM), a rigid magnetic disk and a optical disk. Optical disks may include, for example, compact disk-read only memory (CD-ROM), compact disk read/write memory (CD-R/W) and DVD. The computer readable program memory may store one or more application programs, an operating system, device drivers, etc. on the computing device, all of which may contain program instructions for execution by the computer processor.

The computer system includes at least one input/output (I/O) device(s), including but not limited to keyboards, displays, etc., can be coupled to the computer system either directly or through intervening I/O controllers. Network adapters may also be coupled to the computer system to enable the system to become coupled to other computer systems or storage devices through intervening private or public networks.

The evidence items are stored in an evidence repository in a data storage structure, such as a database. As used in this specification, the term "database" refers to any data structure for storing and/or organizing data communicated to the database. The database may be a relational database (for example, Oracle database, mySQL database, and the like), spreadsheets, XML files, and text file, and the like.

The items of evidence may be communicated by the user via machine-to-machine communication via a communication network selected from at least one of a Local Area Network (LAN), a Metropolitan Area Network (MAN), a Wide Area Network (WAN), a Public Switched Telephone Network (PSTN), a Wireless Application Protocol (WAP) network, a Bluetooth network, a wireless LAN network, or an Internet Protocol (IP) network.

According to illustrative embodiments, the present disclosure may be implemented using at least one non-transitory computer readable medium having stored thereon computer executable instructions that when executed by the processor of a computer controls the computer to perform steps. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101. Exemplary computer readable media suitable for implementing the present disclosure include non-transitory computer readable media, such as disk memory devices, chip memory devices, programmable logic devices, and application specific integrated circuits.

The present disclosure may be described herein in terms of functional block components and various processing steps. It will be understood that each functional block of the block diagrams and the flowchart illustrations, and combinations of functional blocks in the block diagrams and flowchart illustrations, respectively, can be implemented by computer program instructions. For example, the system may employ various integrated circuit components, e.g., memory elements, processing elements, logic elements, look-up tables, and the like, which may carry out a variety of functions under the control of one or more processors or other control devices. Similarly, the software elements of the system may be implemented with any programming or scripting language with the various algorithms being implemented with any combination of data structures, objects, processes, routines or other programming elements.

As used in this specification any reference to the phrases "one embodiment" or "an embodiment" means that a particular element, feature, structure, process step, or characteristic described in connection with the embodiment is included in at least one embodiment. The particular element, feature, structure, process step, or characteristic may, in fact, be included in more than one embodiment disclosed herein. Furthermore, the use of the phrase "in one embodiment" in various places in the specification do not necessarily all refer to the same embodiment.

As used in this specification, the terms "comprises," "contains," "containing," "comprising," "includes," "including," "has," or "having," are open-ended expressions and are intended to cover methods, processes, products, apparatus, or systems that comprise a recited list of components, elements, and features, and any and all additional components, elements and features that are not expressly recited.

As used in the present specification, the term "or" refers to an inclusive "or" and not to an exclusive "or". For example, the phrase "A or B" is satisfied by any one of the following: A is present (element or method step) and B is not present (element or method step), A is not present (element or method step) and B is present (element or method step), and both A and B are present (element or process step).

As used in the present specification, "a" or "an" is employed to describe components, elements, features and method/process steps of various illustrative embodiments disclosed herein. The use of "a" or "an" should be interpreted to include one or more than one.

As used in the present specification, any of the terms "preferably," "commonly," and "typically" are not intended to, and do not, limit the scope of the claimed computer system or computer-implemented method, or to imply that certain features are critical, essential, important, or required to the structure or function of the claimed computer system or computer-implemented method. Rather, these terms are merely intended to identify particular aspects of an embodiment or to emphasize alternative or additional features that may or may not be utilized in a particular embodiment.

While the executable computer software, computer storage medium, computer system, electronic claims package, and method of repairing collision damage have been described above in connection with certain illustrative embodiments, including those embodiments shown in the various drawing figures, it is to be understood that other embodiments may be used or modifications and additions may be made to the described embodiments for performing the same function of the present embodiments without deviating therefrom. Further, all embodiments disclosed are not necessarily in the alternative, as various embodiments of the invention may be combined to provide the desired characteristics. Variations can be made by one having ordinary skill in the art without departing from the spirit and scope of the disclosure. Therefore, the present disclosure should not be limited to any single embodiment, but rather construed in breadth and scope in accordance with the recitation of the attached claims.

The invention claimed is:

1. A computer-implemented method for preparing an insurance claims settlement package carried out by a computer system comprising one or more processors coupled to a non-transitory computer-readable storage medium having computer software stored thereon, the method comprising:

executing the computer software to cause the one or more processors to perform operations for preparing the insurance claims settlement package, the operations comprising:

preparing an electronic vehicle collision damage repair plan for a damaged vehicle having at least one work operation for repairing said damaged vehicle;

preparing an image file of an image of the electronic vehicle collision damage repair plan having an outer perimeter dimension, wherein the image of the electronic vehicle collision damage repair plan displays said at least one work operation for repairing the damaged vehicle;

electronically creating an electronic overlay grid and configuring the outer perimeter dimension of the electronic overlay grid to be substantially coextensive with the outer perimeter dimension of the image of the electronic vehicle collision damage repair plan;

electronically positioning the electronic grid overlay over the image of the electronic vehicle collision damage repair plan for the damaged vehicle;

electronically creating and configuring the dimensions of at least one electronic overlay evidence region and coordinates of each of said at least one electronic overlay evidence region for positioning each of said at least one electronic overlay evidence region within the electronic grid overlay;

electronically positioning the at least one electronic overlay evidence region based on its dimensions and coordinates within the electronic grid overlay over a specific work operation displayed by the underlying image of the electronic vehicle collision damage repair plan;

storing a first list of evidence item IDs relating to evidence items relating to the electronic vehicle collision damage repair plan in a non-transitory computer storage medium, wherein the evidence items are selected from at least one of digital images of regions of damage on the damaged vehicle, videos of damaged regions of the damaged vehicle, digital images of replacement parts, drawings of replacement parts, digital images of hardware for replacement parts, electronic documents containing damage repair directions, guidance and/or instructions for carrying out a work operation of the electronic vehicle collision damage repair plan, or combinations thereof;

storing a second list of evidence item IDs associated with at least one electronic overlay evidence region related to the specific work operation for repairing the damaged vehicle in a non-transitory computer storage medium;

retrieving the first list of evidence item IDs relating to the electronic vehicle collision damage repair plan from the non-transitory computer storage medium;

comparing the first list of retrieved evidence item IDs relating to the electronic vehicle collision damage repair plan to the stored second list of evidence item IDs associated with the at least one electronic overlay evidence region related to the specific work operation for repairing the damaged vehicle; and electronically linking and storing the retrieved evidence item IDs from the first list of evidence item IDs relating to the electronic vehicle collision damage repair plan that match the second list of evidence item IDs associated with the electronic overlay evidence region as an evidence item ID listing associated with a specific electronic overlay evidence region.

2. The computer-implemented method for preparing an insurance claims settlement package of claim 1, wherein the electronic overlay grid is transparent.

3. The computer-implemented method for preparing an insurance claims settlement package of claim 1, wherein said electronic overlay evidence regions are semi-transparent.

4. The computer-implemented method for preparing an insurance claims settlement package of claim 3, wherein said electronic overlay evidence regions are semi-transparent and colored to correspond to said work operations for repairing said damaged vehicle displayed on the image.

5. The computer-implemented method for preparing an insurance claims settlement package of claim 1, wherein the perimeter of the electronic overlay evidence region is generated to be substantially coextensive with the perimeter of the underlying work operation displayed on the image of the repair plan.

6. The computer-implemented method for preparing an insurance claims settlement package of claim 1, wherein the file format of the initial repair plan is generated in portable document format and is converted to an image file.

7. The computer-implemented method for preparing an insurance claims settlement package of claim 6, wherein the image file of the vehicle damage repair plan is selected from a compressed format image file, an uncompressed format image file, or a vector format image file.

8. The computer-implemented method for preparing an insurance claims settlement package of claim 7, wherein the image file formats are selected from JPEG (Joint Photographic Experts Group), JFIF (JPEG File Interchange Format), EXIF (Exchangeable Image File Format), TIFF (Tagged Image File Format), GIF (Graphics Interchange Format), BMP (Bitmap), PNG (Portable Network Graphics), Portable PixMap format (PPM), Portable GrayMap format (PGM), and Portable BitMap format (PBM).

9. The computer-implemented method for preparing an insurance claims settlement package of claim 1, wherein the digital images of damaged regions of the vehicle are selected from front bumper, hood, roof of passenger cabin, trunk, rear bumper, driver's side front side panel, driver's side front door, driver's side rear door, driver's side rear panel, passenger side front side panel, passenger side front door, passenger side rear door, passenger side rear panel and rear bumper of the exterior body of the vehicle.

10. The computer-implemented method for preparing an insurance claims settlement package of claim 1, wherein the documents are selected from Original Equipment Manufacturer (OEM) replacement part documents, Original Equipment Manufacturer (OEM) repair information or instructions, Non-Original Equipment Manufacturer (Non-OEM) replacement part documents, or Non-Original Equipment Manufacturer (Non-OEM) repair information or instructions.

11. A non-transitory computer-readable storage media coupled to one or more processors and having instructions stored thereon which, when executed by the one or more processors, cause the one or more processors to perform operations for preparing an insurance claims package, the operations comprising:
  preparing an image file of an image of the electronic vehicle collision damage repair plan having an outer perimeter dimension, wherein the image of the electronic vehicle collision damage repair plan displays at least one work operation for repairing the damaged vehicle;
  electronically creating an electronic overlay grid and configuring the outer perimeter dimension of the electronic overlay grid to be substantially coextensive with the outer perimeter dimension of the image of the electronic vehicle collision damage repair plan;
  electronically positioning the electronic grid overlay over the image of the electronic vehicle collision damage repair plan for the damaged vehicle;
  electronically creating and configuring the dimensions and coordinates of at least one electronic overlay evidence region for positioning each of said at least one electronic overlay evidence region within the electronic grid overlay;
  electronically positioning the at least one electronic overlay evidence region based on its dimensions and coordinates within the electronic grid overlay over a specific work operation displayed by the underlying image of the electronic vehicle collision damage repair plan;
  storing a first list of evidence item IDs relating to evidence items relating to the electronic vehicle collision damage repair plan in a non-transitory computer storage medium, wherein the evidence items are selected from at least one of digital images of regions of damage on the damaged vehicle, videos of damaged regions of the damaged vehicle, digital images of replacement parts, drawings of replacement parts, digital images of hardware for replacement parts, electronic documents containing damage repair directions, guidance and/or instructions for carrying out a work operation of the electronic vehicle collision damage repair plan, or combinations thereof;
  storing a second list of evidence item IDs associated with at least one electronic overlay evidence region related to the specific work operation for repairing the damaged vehicle in a non-transitory computer storage medium;
  retrieving the first list of evidence item IDs relating to the electronic vehicle collision damage repair plan from the non-transitory computer storage medium;
  comparing the first list of retrieved evidence item IDs relating to the electronic vehicle collision damage repair plan to the stored second list of evidence item IDs associated with the at least one electronic overlay evidence region related to the specific work operation for repairing the damaged vehicle; and
  electronically linking and storing the retrieved evidence item IDs from the first list of evidence item IDs relating to the electronic vehicle collision damage repair plan that match the second list of evidence item IDs associated with the electronic overlay evidence region as an evidence item ID listing associated with a specific electronic overlay evidence region.

12. A computer system comprising:
  one or more processors; and
  a non-transitory computer-readable storage medium coupled to the one or more processors and having instructions stored thereon which, when executed by the one or more processors, cause the one or more processors to perform operations for preparing an insurance claims package, the operations comprising:
  preparing an electronic vehicle collision damage repair plan for a damaged vehicle;
  preparing an image file of an image of the electronic vehicle collision damage repair plan having an outer perimeter dimension, wherein the image of the vehicle collision damage repair plan displays at least one work operation for repairing the damaged vehicle;
  electronically creating an electronic overlay grid and configuring the outer perimeter dimension of the electronic overlay grid to be substantially coextensive with the outer perimeter dimension of the image of the electronic vehicle collision damage repair plan;
  electronically positioning the electronic grid overlay over the image of the electronic vehicle collision damage repair plan for the damaged vehicle;
  electronically creating and configuring the dimensions and coordinates of at least one electronic overlay evidence region for positioning each of said at least one electronic overlay evidence region within the electronic grid overlay;
  electronically positioning the at least one electronic overlay evidence region based on its dimensions and coordinates within the electronic grid overlay over a specific work operation displayed by the underlying image of the electronic vehicle collision damage repair plan;
  storing a first list of evidence item IDs relating to evidence items relating to the electronic vehicle collision damage repair plan in a non-transitory computer storage medium, wherein the evidence items are selected from at least one of digital images of regions of damage on the damaged vehicle, videos of damaged regions of the damaged vehicle, digital images of replacement parts, drawings of replacement parts, digital images of hardware for replacement parts, electronic documents containing damage repair directions, guidance and/or instructions for carrying out a work operation of the electronic vehicle collision damage repair plan, or combinations thereof;
  storing a second list of evidence item IDs associated with at least one electronic overlay evidence region related to the specific work operation for repairing the damaged vehicle in a non-transitory computer storage medium;
  retrieving the first list of evidence item IDs relating to the electronic vehicle collision damage repair plan from the non-transitory computer storage medium;
  comparing the first list of retrieved evidence item IDs relating to the electronic vehicle collision damage repair plan to the stored second list of evidence item IDs associated with the at least one electronic overlay evidence region related to the specific work operation for repairing the damaged vehicle; and electronically linking and storing the retrieved evidence item IDs from the first list of evidence item IDs relating to the electronic vehicle collision damage repair plan that match the second list of evidence item IDs associated with the electronic overlay evidence region as an evidence item ID listing associated with a specific electronic overlay evidence region.

13. A method of repairing vehicle collision damage comprising:

receiving a vehicle having collision damage;

inspecting the vehicle to determine said collision damage;

collecting evidence items relating to the collision damage to the vehicle and to the repair of the damaged vehicle;

preparing an electronic insurance claims settlement package by a computer-implemented method using a computer system comprising one or more processors coupled to a non-transitory computer-readable storage medium having computer software stored thereon, the method comprising executing the computer software to cause the one or more processors to perform operations for preparing the insurance claims settlement package, the operations comprising:

(a) preparing an electronic vehicle collision damage repair plan for a damaged vehicle having at least one work operation for repairing said damaged vehicle, (b) preparing an image file of an image of the electronic vehicle collision damage repair plan having an outer perimeter dimension, wherein the image of the electronic vehicle collision damage repair plan displays said at least one work operation for repairing the damaged vehicle, (c) electronically creating an electronic overlay grid and configuring the outer perimeter dimension of the electronic overlay grid to be substantially coextensive with the outer perimeter dimension of the image of the electronic vehicle collision damage repair plan;

(d) electronically positioning the electronic grid overlay over the image file of the electronic vehicle collision damage repair plan for the damaged vehicle, (e) electronically creating and configuring the dimensions of at least one electronic overlay evidence region and coordinates of each of said at least one electronic overlay evidence region for positioning each of said at least one electronic overlay evidence region within the electronic grid overlay;

(f) electronically positioning the at least one electronic overlay evidence region based on its dimensions and coordinates within the electronic grid overlay over a specific work operation displayed by the underlying image of the electronic vehicle collision damage repair plan, (g) storing a first list of evidence item IDs relating to evidence items relating to the electronic vehicle collision damage repair plan in a non-transitory computer storage medium, wherein the evidence items are selected from at least one of digital images of regions of damage on the damaged vehicle, videos of damaged regions of the damaged vehicle, digital images of replacement parts, drawings of replacement parts, digital images of hardware for replacement parts, electronic documents containing damage repair directions, guidance and/or instructions for carrying out a work operation of the electronic vehicle collision damage repair plan, or combinations thereof;

(h) storing a second list of evidence item IDs associated with at least one electronic overlay evidence region related to the specific work operation for repairing the damaged vehicle in a non-transitory computer storage medium;

(i) retrieving the first list of evidence item IDs relating to the electronic vehicle collision damage repair plan from the non-transitory computer storage medium;

(j) comparing the first list of retrieved evidence item IDs relating to the electronic vehicle collision damage repair plan to the stored second list of evidence item IDs associated with the at least one electronic overlay evidence region related to the specific work operation for repairing the damaged vehicle, and (k) electronically linking and storing the retrieved evidence item IDs from the first list of evidence item IDs relating to the electronic vehicle collision damage repair plan that match the second list of evidence item IDs associated with the electronic overlay evidence region as an evidence item ID listing associated with a specific electronic overlay evidence region;

submitting the electronic insurance claims settlement package to an insurance company for settlement of an insurance claim relating to the damaged vehicle; and repairing the damaged vehicle in accordance with a settled insurance claim.

14. The non-transitory computer-readable storage media of claim 11, wherein the electronic overlay grid is transparent.

15. The non-transitory computer-readable storage media of claim 11, wherein said electronic overlay evidence regions are semi-transparent.

16. The non-transitory computer-readable storage media of claim 15, wherein said electronic overlay evidence regions are semi-transparent and colored to correspond to said work operations for repairing said damaged vehicle displayed on the image.

17. The non-transitory computer-readable storage media of claim 11, wherein the perimeter of the electronic overlay evidence region is substantially coextensive with the perimeter of the underlying work operation displayed on the image of the electronic vehicle collision damage repair plan.

18. The non-transitory computer-readable storage media of claim 11, wherein the image file of the electronic vehicle collision damage repair plan is selected from a compressed format image file, an uncompressed format image file, or a vector format image file.

19. The non-transitory computer-readable storage media of claim 18, wherein the image file formats are selected from JPEG (Joint Photographic Experts Group), JFIF (JPEG File Interchange Format), EXIF (Exchangeable Image File Format), TIFF (Tagged Image File Format), GIF (Graphics Interchange Format), BMP (Bitmap), PNG (Portable Network Graphics), Portable PixMap format (PPM), Portable GrayMap format (PGM), and Portable BitMap format (PBM).

20. The non-transitory computer-readable storage media of claim 11, wherein the digital images of damaged regions of the vehicle are selected from front bumper, hood, roof of passenger cabin, trunk, rear bumper, driver's side front side panel, driver's side front door, driver's side rear door, driver's side rear panel, passenger side front side panel, passenger side front door, passenger side rear door, passenger side rear panel and rear bumper of the exterior body of the vehicle.

21. The non-transitory computer-readable storage media of claim 11, wherein the documents are selected from Original Equipment Manufacturer (OEM) replacement part documents, Original Equipment Manufacturer (OEM) repair information or instructions, Non-Original Equipment Manufacturer (Non-OEM) replacement part documents, or Non-Original Equipment Manufacturer (Non-OEM) repair information or instructions.

* * * * *